March 17, 1936.　　　G. W. BRADY　　　2,034,223
MACHINE GUN MOUNTING FOR AIRCRAFT
Filed May 12, 1933　　　3 Sheets-Sheet 1
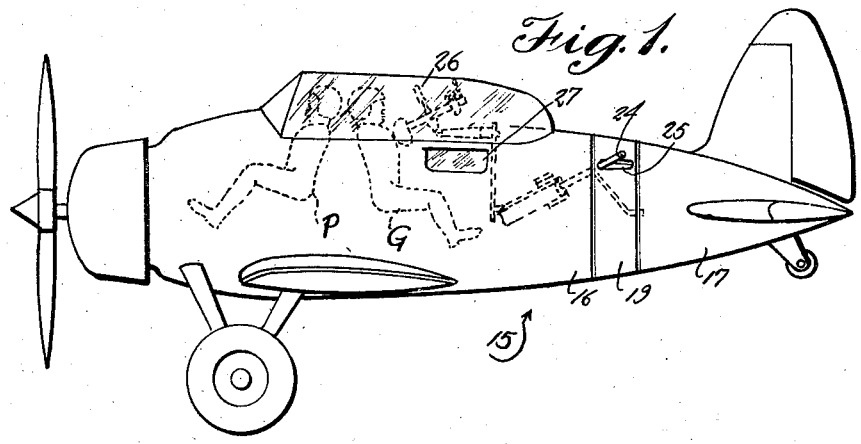
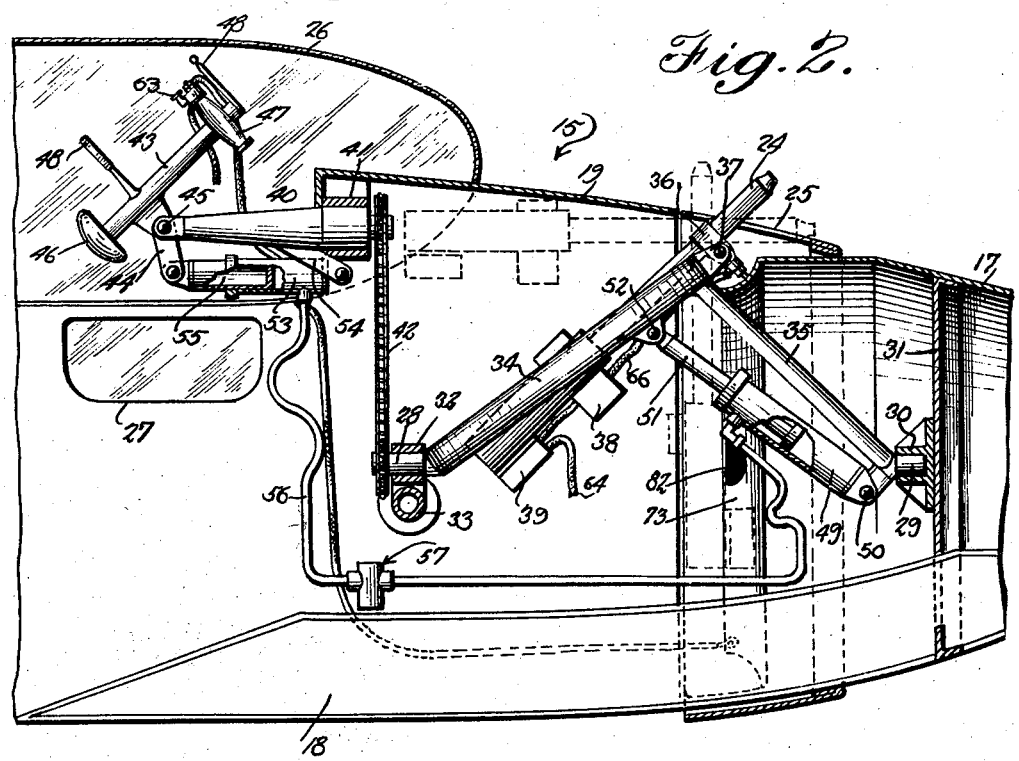
Inventor
George W. Brady.
By B. D. Emanuel
Attorney

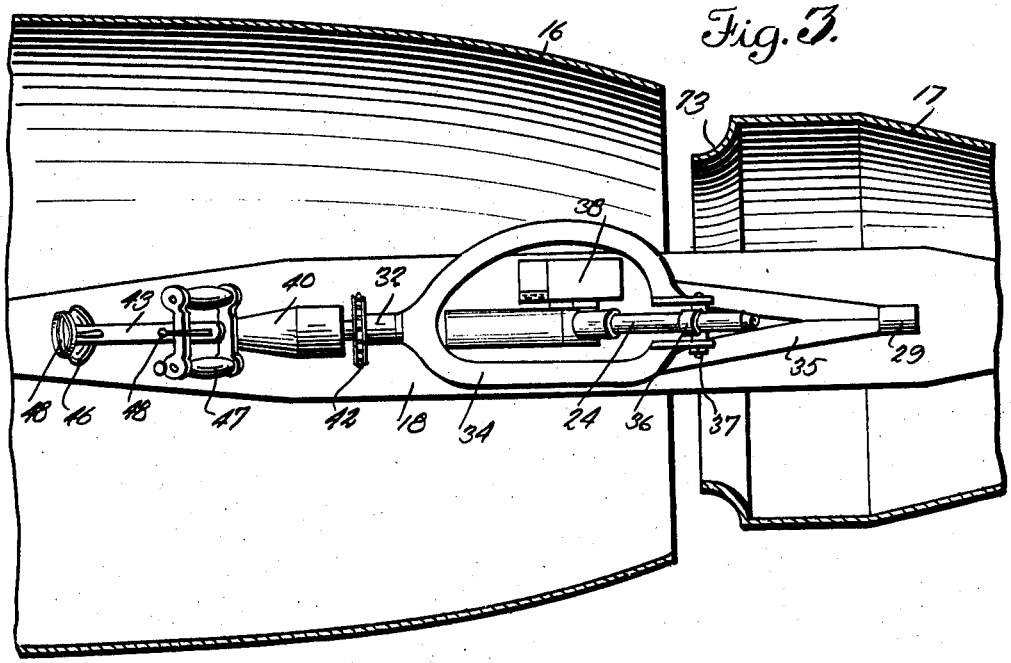
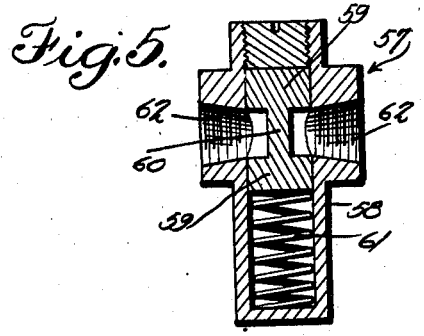
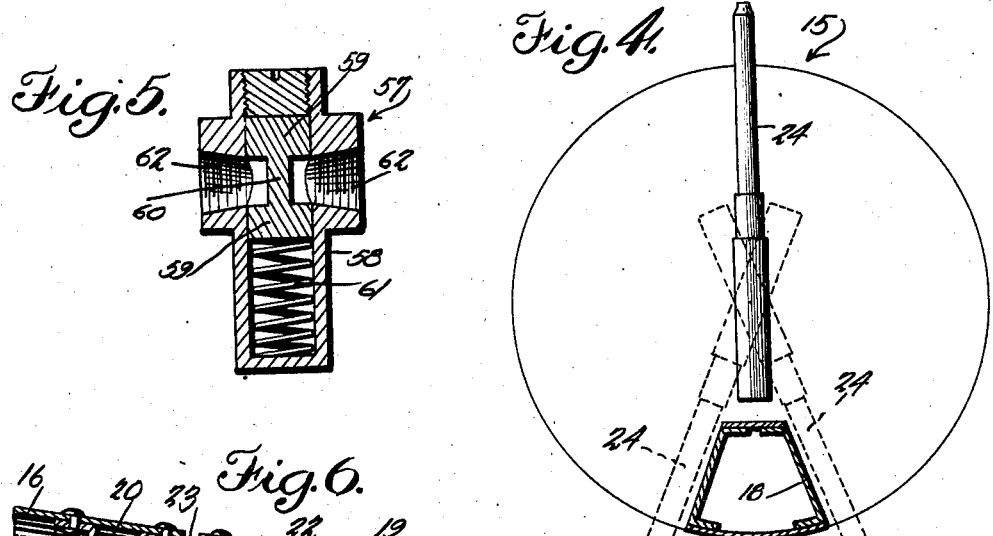
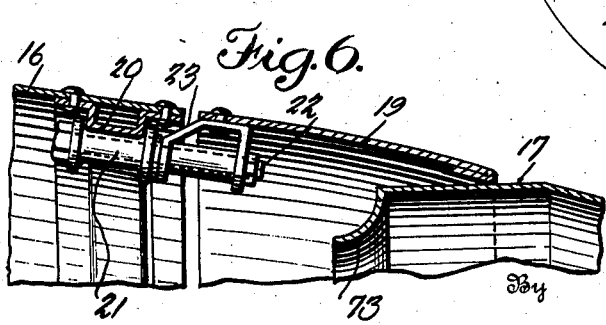

March 17, 1936.  G. W. BRADY  2,034,223
MACHINE GUN MOUNTING FOR AIRCRAFT
Filed May 12, 1933   3 Sheets-Sheet 3
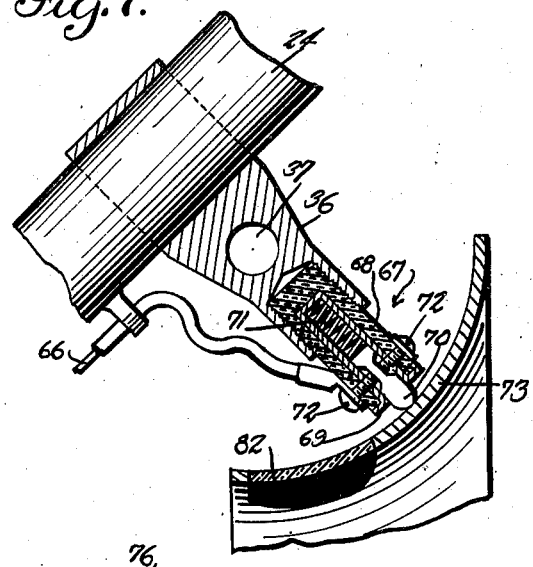
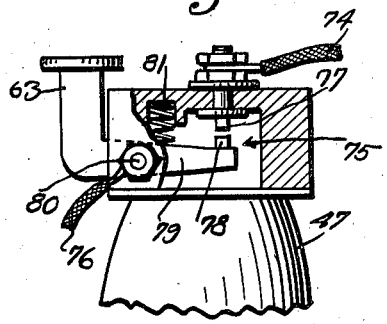
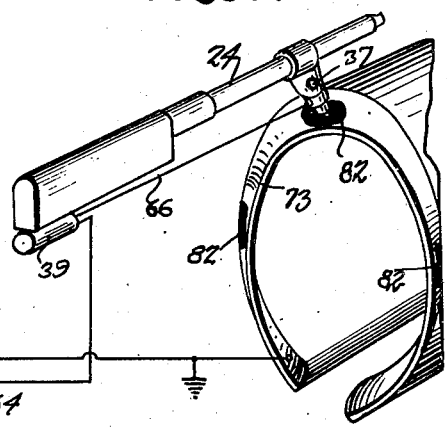
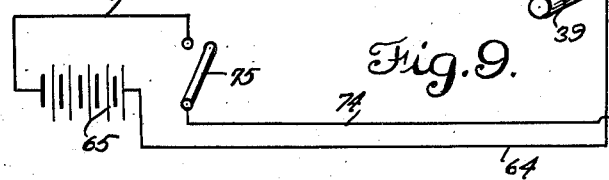
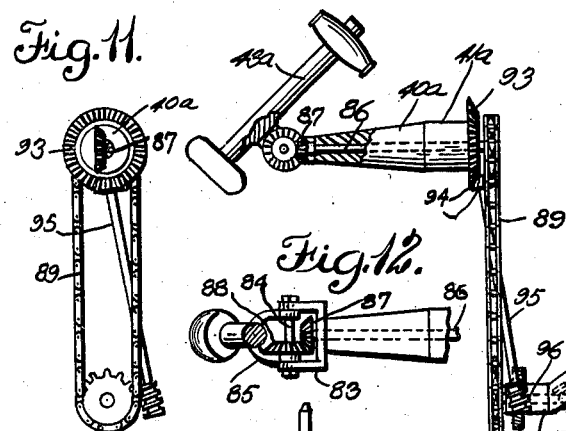
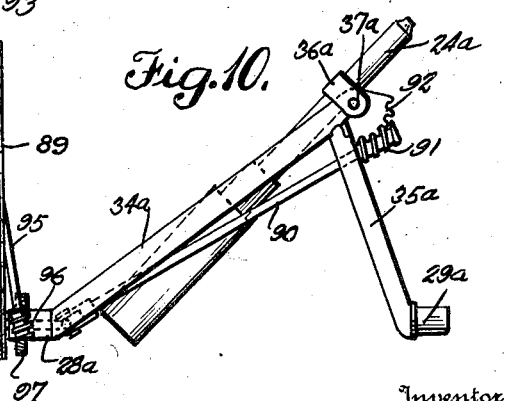
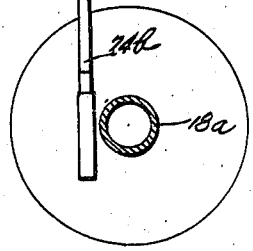
Inventor
George W. Brady.
By B. D. Emanuel
Attorney Patented Mar. 17, 1936

2,034,223

UNITED STATES PATENT OFFICE 2,034,223

MACHINE GUN MOUNTING FOR AIRCRAFT

George W. Brady, Anderson, Ind.

Application May 12, 1933, Serial No. 670,771

5 Claims. (Cl. 89—40)

This invention relates to certain new and useful improvements in machine gun mountings for aircraft.

The primary object of the invention is to provide a machine gun mounting for aircraft wherein the mounting and the gun are shiftable by the operator or gunner so that the gun may be trained over a large range without interference to the gunner or to the gun from the air blast at high speed.

A further object of the invention is to provide a means associated with the trigger mechanism of a flexibly mounted machine gun, which means will prevent operation of the firing mechanism of the gun at any time when the line of fire of the gun intersects any part of the aircraft.

A further object of the invention is to provide the aircraft with a transparent cockpit hood for the protection of the gunner designed for maintaining the streamline of the aircraft and for protecting the gunner from air blasts.

A further object of the invention is to provide a remote control for a machine gun and mounting therefor in aircraft with recoil of the gun absorbed by the mounting mechanism and prevented from being transmitted to the gunner, thereby increasing the accuracy of the gunner's aim.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a side elevational view of an airplane with the machine gun and adjustable mounting therefor illustrated by dotted lines;

Figure 2 is an enlarged fragmentary longitudinal sectional view showing the movable mounting for the machine gun, the remote control for the gun and the operating means for the movable mounting;

Figure 3 is an enlarged fragmentary horizontal sectional view showing the machine gun and mounting therefor;

Figure 4 is a diagrammatic view, partly in section showing the large range of movement for the machine gun and also a section of the girder connecting the sections of the fuselage;

Figure 5 is a detail sectional view of the means interposed between the sighting arm and gun for automatically locking the gun when the applied acceleration exceeds a predetermined value;

Figure 6 is a fragmentary longitudinal sectional view showing an annular space between sections of the fuselage covered by a ring or fairing through which the muzzle of the machine gun extends;

Figure 7 is a detail sectional view showing an electrical control means for the firing mechanism of the machine gun;

Figure 8 shows the remote trigger control for the machine gun mounted on a hand grip of the sighting arm;

Figure 9 is a perspective view of the machine gun and a cooperating part of the airplane fuselage with the wiring arrangement for controlling operation of the firing mechanism of the machine gun;

Figure 10 shows in side elevation, another form of remote control mechanism for the machine gun and its adjustable mounting;

Figure 11 is an end elevational view of a part of the mechanism shown in Figure 10;

Figure 12 is a detail view, partly in section of a part of the remote control mechanism shown in Figure 10; and Figure 13 is a diagrammatic view, partly in section, similar to Figure 4, showing a center brace connection between sections of the fuselage permitting a maximum gun range of 360°.

Referring more in detail to the accompanying drawings, and particularly to Figures 1 to 4, the aircraft is illustrated in the form of an airplane 15 in which the fuselage thereof comprises a relatively long front body portion 16 and a shorter tail portion 17 connected together by a longitudinally extending girder 18 with an annular space between the sections 16 and 17, this girder extending a relatively short distance at opposite sides of the space between the fuselage sections. The annular space between the sections 16 and 17 of the fuselage is covered by a ring or fairing 19 which is freely rotatably mounted thereover with its rear edge overlapping the forward edge of the tail section 17 of the fuselage while a track and roller arrangement forms a connection between the forward edge of the fairing 19 and the rear edge of the fuselage section 16. As shown in detail in Figure 6, an internal annular track is carried by the rear end of the fuselage section 16 with which flanged guide rollers 21 are engaged, these rollers being freely journalled upon spindles 22 carried by brackets 23 projecting inwardly of the forward end of the fairing 19. A series of rollers 21 is provided for the free and easy rotatable mounting of the fairing 19. As diagrammatically illustrated in Figure 1, the airplane 15 is under control of the pilot P. The gunner G who faces aft remotely controls the machine gun 24 through the medium of sighting devices and mechanism connected with the gun, the muzzle of the gun projecting through a slotted opening 25 in the fairing 19. The cockpit of the airplane seating the pilot and gunner is enclosed by a transparent enclosure or cabin 26 providing clear vision while the sides of the fuselage section 16 in proximity of the gunner have transparencies 27 for sighting through the sides and below the airplane.

The gun mount shown in Figures 2 and 3 comprises a frame of substantially V-form having opposite bearing ends 28 and 29. The bearing 29 seats in a journal 30 carried by the support 31 in the tail section 17 of the fuselage while the forward bearing end 29 of the gun frame mounting seats in the journal 32 of the bracket 33. The gun frame mounting further includes a loop support 34 projecting from the bearing 28 and a fork support 35 projecting from the bearing 29, the support 34 and 35 with the bearings 28 and 29 forming an integral construction.

The machine gun 24 is pivotally mounted at a point within the annular space between the fuselage sections 16 and 17 and inwardly of the fairing 19 with the muzzle end of the gun projecting through the fairing slot 25, the pivotal mounting including a strap 36 inclosing the barrel of the gun and pivoted as at 37 upon the upper end of the loop frame 34, the rear end of the machine gun 24 carrying the ammunition box 38 and solenoid or other device 39 for the operation of the gun trigger and being disposed within the loop frame 34.

The mounting frame bearings 28 and 29 are in line with longitudinal axis of the airplane body with means engageable with the bearing 28 for shifting the frame members 34 and 35 in a circular path to cause the machine gun 24 to travel in a similar path with the frame. The operating means for the gun supporting frame includes a shaft 40 journalled at one end in a bearing 41 at a point adjacent the gunner's seat and above the bearing 28. Chain and sprocket connections 42 form communication between the shaft 40 and the bearing 28 and upon operation of the chain and sprocket mechanism the bearing 28 is rotated for shifting the frame members 34 and 35 together with the machine gun 24 carried thereby. Operating means for the shaft 40 includes the gunner's sighting arm 43 that carries at its underside a bell crank lever 44 that is pivotally connected intermediate its ends as at 45 to the rear adjacent end of the shaft 40. The sighting arm 43 includes a breast plate 46, hand grips 47 and sighting devices 48.

It is intended that the longitudinal axis of the machine gun 24 remains constantly parallel with the longitudinal axis of the sighting arm 43 and to maintain this relationship between the machine gun and sighting arm, a cylinder 49 is pivotally mounted at one end at 50 to the frame support 35 adjacent its bearing 29, the cylinder 49 housing a reciprocating piston, the rod 51 of which is pivotally connected as at 52 to the underside of the machine gun 24 at a point inwardly of the pivotal mounting 37 for the machine gun. A cylinder 53 is rigidly attached by means of the arm 54 of the shaft 40, being parallel with the shaft and houses a reciprocating piston 55 pivotally attached to the free end of the bell crank lever 44. Flexible tubing 56 connects the cylinders 49 and 53 so that upon pivotal movement of the sighting arm 43 at the point 45, the piston 51 is operated in the desired direction for moving the machine gun 24 to maintain the parallel relation between the machine gun and sighting arm. The movements of the pistons in the two cylinders 49 and 53 effects a transfer of fluid through the conduit 56 containing the machine gun 24 and sighting arm 43 parallel with each other and to make it possible to relieve the operating loads on the sighting arm, and for automatically locking the gun in position whenever the applied acceleration exceeds an arbitrarily set value, a check device 57 as shown in Figures 2 and 5 is set into the conduit 56. The check device 57 comprises the valve casing 58 housing a reciprocating plunger valve including end heads 59 connected by a center pin 60 and engaged by the coil spring 61 confined within the valve casing for normally presenting the pin 60 in line with diametrically opposite nipples 62 to which sections of the flexible conduit 56 are connected as shown in Figure 2. In the event of applied acceleration through sudden movement of the aircraft the check device 57 operates to cut off the flow of fluid through said check device 57 and conduit 56, the reciprocating plunger valve 59 and 60 moving downward due to the force of the applied acceleration against the tension of the spring 61. When the applied acceleration has reached the arbitrarily set value, the reciprocating plunger valve 59 will have moved downward against the tension of the spring 61 so that the valve is closed and the gun 24 is locked against shifting movement during continuation of the applied acceleration.

To obtain the desired elevation of the machine gun 24 or movements of the machine gun upon its pivotal mounting 37, with the gun remaining in parallelism of the sighting arm 43 at all times, the pilot G locates an object through the sighting devices 48 associated with the sighting arm 43 and by gripping the handles 47, the sighting arm is moved on its pivotal mounting 45 for the remote control of the machine gun, this movement of the sighting arm 43 being transmitted through the bell crank lever 44, cylinder devices 49 and 53 and the flexible conduit 56 to the machine gun. The machine gun 24 has a further range adjustment annularly of the airplane by rotary movement of the frame support for the machine gun on its bearings 28 and 29. To accomplish this annular range adjustment, the sighting arm 43 and hand grips 47 are employed for imparting rotary movement to the shaft 40 for the operation of the chain and sprocket connections between the shaft 40 and bearing 28 for shifting the gun frame in a rotary direction. The fairing 19 being freely rotatably supported at the rear end of the fuselage section 16 and having the muzzle end of the gun 24 projecting through the slotted opening 25 therein is freely rotated with the gun and provides a protection for all of the operating mechanism. The wide range of annular adjustment of the frame and gun is diagrammatically illustrated in Figure 4, this annular range adjustment being limited only by the connecting girder 18 between the lower ends of the fuselage sections 16 and 17 located at the lower sides thereof.

The gun 24 is illustrated by dotted lines in Figure 2 as being positioned at right angles and also parallel with the longitudinal axis of the airplane and to prevent operation of the firing mechanism of the gun when the muzzle end thereof is directed toward or the line of fire intersects any part of the tail end of the airplane, control devices for the firing mechanism are provided, such as shown in Figures 2 and 7 to 9. While the firing mechanism of the gun may be controlled in the presence of the foregoing conditions by mechanical or hydraulic means for transmitting an impulse from the trigger 63 mounted on one of the handles 47 upon the sighting arm 43, for the remote control of the firing mechanism 39 directly associated with the gun 24, there has for purposes of illustration been illustrated electrical control means. The firing mechanism 39 of the machine gun 24 comprises a solenoid or equivalent device for actuating the firing mechanism upon the passage therethrough of an electrical current and from one terminal of the solenoid in the firing device 39, there leads a wire 64 to a source of electrical energy 65. The other terminal of the solenoid of the firing mechanism is connected by a wire 66 to a contact 67 carried by the strap bearing 36 where the machine gun 24 is pivotally mounted upon the frame supports 34 and 35 at the point 37, the contact 67 being movable with the gun. The contact 67 includes an insulating body 68 set into a socket in the end of the strap 36 outwardly of the pivotal mounting 37. A metallic bushing 69 is inserted in the insulating body 68 and receives an end projecting contact point 70 tensioned as at 71 and retained in position in the metallic bushing 69 by means of the radial screws 72, one of which screws forms an anchor for the electric wire 66. The forward end of the tail portion 17 of the fuselage carries an annular contact flange 73 of arcuate formation in cross section and centering on the pivot 37 for the machine gun 24 so that regardless of the position of the machine gun and the frame support therefor, the contact point 70 remains constantly engaged with the contact flange 73. The contact flange 73 has a wire connection 74 with one side of a switch 75, the other side of the switch 75 being connected by the wire 76 to the other terminal of the source of energy 65. As shown in Figure 8, the switch 75 is mounted upon the handle 47 on the sighting arm 43, the wire 74 being connected to the contact 77 while the wire 76 leads to the contact 78. The contact 78 is mounted on an arm 79 pivotally mounted as at 80 and moved by the trigger 63 against the tension of the spring 81 that normally holds the contacts 77 and 78 spaced from each other. To render the firing mechanism inoperative at any time when the machine gun 24 is directed toward a part of the airplane, the contact flange 73 has set therein a series of insulation sections 82 that are respectively engaged by the contact point 70 to break the circuit even though the trigger 63 is operated when the gun is directed toward a part of the airplane. As soon as the gun is moved to aim away from a part of the airplane, the contact point 70 moves away from the insulation surface 82 and onto the contact flange 73 so that the gun can be fired upon operation of the trigger 63.

Another form of shifting means for the gun and its mounting is illustrated in Figures 10 to 12 wherein an irreversible control system is employed and includes frame members 34a and 35a having journal end bearings 28a and 29a. The gun 24a is mounted in the frame members 34a and 35a by means of the strap bearing 36a pivotally supported as at 37a. The shaft 40a has a yoke 83 fixed to one end thereof and in which a cross pin 84 is journalled and upon which cross pin a clevis 85 is fixed with the sighting arm 43 rigid with the clevis 85. A rod 86 is journalled through the rotatable shaft 40a and carries at its inner end within the yoke 83, a bevel gear 87 fixed to one end of the rod 86 meshing with the bevel gear 88 fixed to the cross pin 84. The other end of the shaft 86 has a chain and sprocket connection 89 with a shaft 90 with an interposed universal joint 90a, the shaft 90 carrying a worm 91 meshing with a worm segment 92 fixed to the strap bearing 36a for the gun 24a. It will therefore be seen that when the sighting arm 43a is moved with the cross pin 84 constituting a pivot therefor, the gear 88 fixed to the cross pin and engaged with the bevel gear 87 rotates the shaft 86 for imparting movement to the shaft 90 by means of the chain and sprocket connection 89, for moving the gun 24a on its pivotal mounting 37a. To move the supporting frame members 34a and 35a on their journal bearings 28a and 29a, a bevel gear 93 is fixed to the rear end of the shaft 40a and meshes with a bevel pinion 94 upon the adjacent end of the depending shaft 95 that carries a worm 96 at its lower end meshing with a worm wheel 97 fixed to the journal bearing 28a. When the sighting arm 43a is moved for rotating the shaft 40a on its longitudinal axis, movement is imparted to the worm drives 96 and 97 for rotating the gun frame supporting members 34a and 35a in a manner as described in connection with the operation of that form of the invention illustrated in Figure 2.

In the body construction of the airplane as shown in Figures 3 and 4, the fuselage sections 16 and 17 are illustrated as connected by a girder 18 at a point adjacent their lower sides to permit a wide annular range of adjustment or movement of the machine gun 24, while in Figure 13, an axial connection 18a is established between the sections 16 and 17 of the airplane fuselage with the machine gun 24b mounted laterally thereof and capable of moving through a complete circle of 360°.

From the above detailed description of the invention, it is believed that the construction and operation thereof will at once be apparent, the particular mounting of the gun permitting the gun to be operated over a large range with no interference to the gunner or the gun from the air blast at high speed and should the gun be trained toward any part of the airplane, the firing mechanism thereof will be rendered inoperative. The transparent hood 26 provides for a clear vision for both the pilot and gunner and the accuracy of the aim of the gunner is maintained at all times in the presence of the remote control and operation of the gun by the devices forming connections between the gun and sighting arm, and with the particular mounting of the gun firing is permitted over a range which includes most of the rear hemisphere, particularly over the lower area which is not in the useful range of present conventional gun mounts.

While there are herein shown and described the preferred embodiments of the present invention, it is nevertheless to be understood that minor changes may be made therein without departing from the spirit and scope of the invention as claimed.

I claim:—

1. In an aircraft, a journalled gun mount and a machine gun pivotally supported in the gun mount, a sighting arm, operating connections between the sighting arm and mount and gun, and means for automatically locking the gun in one of its degrees of freedom of movement whenever the applied load on the aircraft exceeds a predetermined value.

2. In an aircraft, a flexible machine gun mount including a frame rotatable about the longitudinal axis of the aircraft, a machine gun pivotally attached to said frame and rotatable in a circular path with said frame and located a short distance within the outer surface of the body of said aircraft with the muzzle of the gun projecting from the body, the axis of said pivot always remaining approximately tangent to said circular path, a shaft parallel to the axis of rotation of the frame, a sighting arm pivotally mounted on said shaft, means for transmitting rotation equally from the sighting arm to the frame, means for transmitting the motion of elevation of the sighting arm with respect to the shaft to motion of elevation of the gun with respect to the frame, the two motions to be so arranged that the sighting arm always remains parallel to the barrel of the gun and a trigger control for firing the gun.

3. In an aircraft, a flexible machine gun mount including a frame rotatable about the longitudinal axis of the aircraft, a machine gun pivotally attached to said frame and rotatable in a circular path with said frame and located a short distance within the outer surface of the body of said aircraft with the muzzle of the gun projecting from the body, the axis of said pivot always remaining approximately tangent to said circular path, a shaft parallel to the axis of rotation of the frame, a sighting arm pivotally mounted on said shaft, means for transmitting rotation equally from the sighting arm to the frame, means for transmitting the motion of elevation of the sighting arm with respect to the shaft to motion of elevation of the gun with respect to the frame, the two motions to be so arranged that the sighting arm always remains parallel to the barrel of the gun, a trigger control for firing the gun and means to reduce the operating forces required to move the gun.

4. In an aircraft, a flexible machine gun mount including a frame rotatable about the longitudinal axis of the aircraft, a machine gun pivotally attached to said frame with the pivot normal to the longitudinal axis of the aircraft and rotatable in a circular path with the frame, a shaft parallel with the axis of rotation of the frame, a sighting arm pivotally mounted on the shaft, means for transmitting rotation equally from the sighting arm to the frame, means for transmitting the motion of elevation of the sighting arm with respect to the shaft to motion of elevation of the gun with respect to the shaft, the two motions to be so arranged that the sighting arm always remains parallel to the barrel of the gun, a trigger control for firing the gun and means for rendering the trigger mechanism inoperative when the gun is directed toward a part of the aircraft.

5. In an aircraft, a flexible machine gun mount including a frame rotatable about the longitudinal axis of the aircraft, a machine gun pivotally attached to said frame with the pivot normal to the longitudinal axis of the aircraft and rotatable in a circular path with the frame, a shaft parallel with the axis of rotation of the frame, a sighting arm pivotally mounted on the shaft, means for transmitting rotation equally from the sighting arm to the frame, means for transmitting the motion of elevation of the sighting arm with respect to the shaft to motion of elevation of the gun with respect to the frame, the two motions being so arranged that the sighting arm always remains parallel to the barrel of the gun, a trigger control for firing the gun, means for rendering the trigger mechanism inoperative when the gun is directed toward a part of the aircraft and means to reduce the operating forces required to move the gun.

GEORGE W. BRADY.